US012409946B1

(12) United States Patent
Jansma

(10) Patent No.: US 12,409,946 B1
(45) Date of Patent: Sep. 9, 2025

(54) INSTRUMENT PANEL SYSTEMS AND METHODS FOR AIRCRAFT COCKPITS

(71) Applicant: Lyle Jansma, Bellingham, WA (US)

(72) Inventor: Lyle Jansma, Bellingham, WA (US)

(73) Assignee: Jansma Design LLC, Bellingham, WA (US)

( * ) Notice: Subject to any disclaimer, the term of this patent is extended or adjusted under 35 U.S.C. 154(b) by 118 days.

(21) Appl. No.: 18/467,477

(22) Filed: Sep. 14, 2023

Related U.S. Application Data

(60) Provisional application No. 63/375,672, filed on Sep. 14, 2022.

(51) Int. Cl.
*B64D 43/00* (2006.01)
*B64F 5/40* (2017.01)

(52) U.S. Cl.
CPC ............... *B64D 43/00* (2013.01); *B64F 5/40* (2017.01)

(58) Field of Classification Search
CPC .................................. B64D 43/00; B64F 5/40
USPC ..................................................... 361/679.01
See application file for complete search history.

(56) References Cited

U.S. PATENT DOCUMENTS

| | | | | |
|---|---|---|---|---|
| 5,995,290 A | * | 11/1999 | Noble | G02B 27/01 348/115 |
| 6,255,964 B1 | * | 7/2001 | Steele, Jr. | G01C 23/00 340/975 |
| 7,420,476 B2 | * | 9/2008 | Stiffler | H04L 67/12 701/4 |
| 2004/0200923 A1 | * | 10/2004 | Lee | B64D 43/00 244/1 R |
| 2017/0363925 A1 | * | 12/2017 | Kostrzewski | G06F 1/1637 |

FOREIGN PATENT DOCUMENTS

WO 2023043604 A1 3/2023

OTHER PUBLICATIONS

Gibbs, Elizabeth; Old Plane, New Panel Innovative Panel Design Enables Avionics Overhaul; Cessna Owner; Oct. 2021; 4 pages; USA.

* cited by examiner

*Primary Examiner* — Jason L Vaughan
(74) *Attorney, Agent, or Firm* — Michael R. Schacht; Schacht Law Office, Inc.

(57) ABSTRACT

A replacement instrument panel assembly for an aircraft having an airframe and an upper skin, the replacement instrument panel assembly has a support system, a base panel assembly, a secondary panel assembly, and a skin extension assembly. The support system is adapted to be secured to the airframe. The base panel assembly is supported by the support system and comprises a base panel member defining at least one main base panel opening. The secondary panel assembly comprises at least one secondary panel member and at least one secondary panel screw. Each secondary panel member defines at least one secondary panel opening and is secured to the base panel by the at least one secondary panel screw. The skin extension assembly comprises a skin extension member supported by the support system and adapted to be secured to a portion of the upper skin.

20 Claims, 11 Drawing Sheets

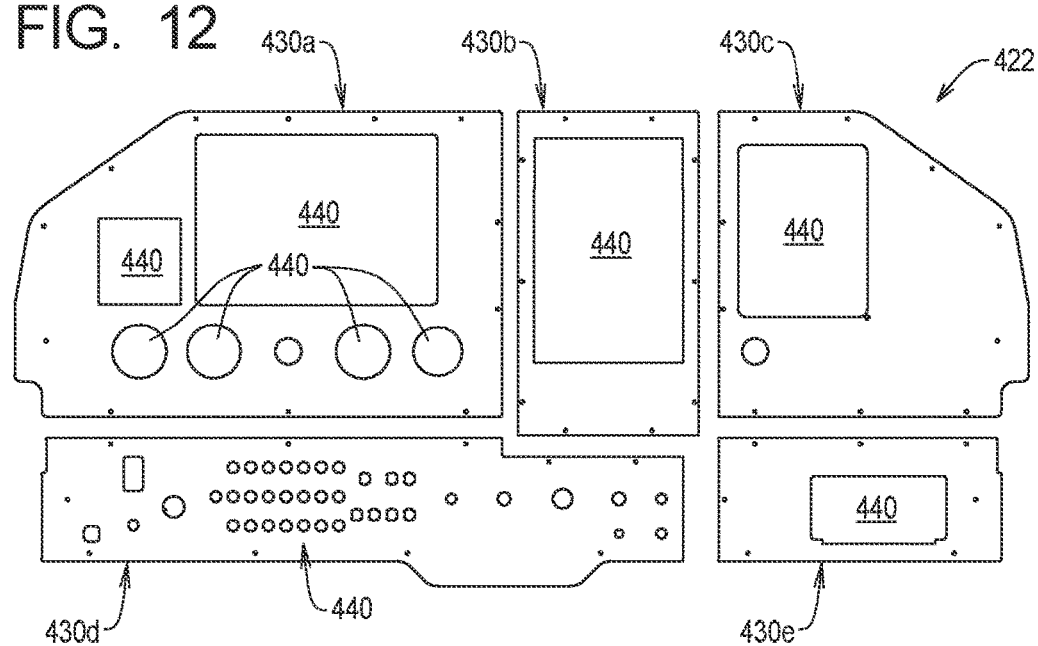
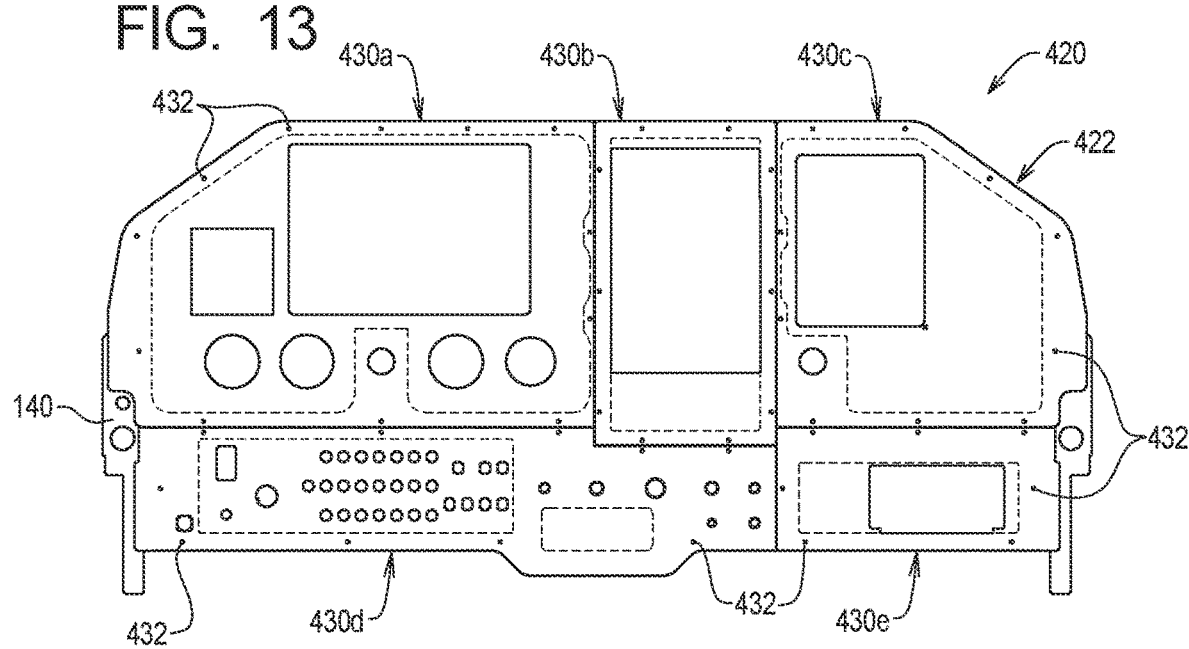

INSTRUMENT PANEL SYSTEMS AND METHODS FOR AIRCRAFT COCKPITS

RELATED APPLICATIONS

This application, U.S. patent application Ser. No. 18/467,477 filed Sep. 14, 2023, claims benefit of U.S. Provisional Application Ser. No. 63/375,672 filed Sep. 14, 2022, now expired, the contents of which are incorporated herein by reference.

TECHNICAL FIELD

The present invention relates to panel systems and methods for supporting instruments in the cockpit of an aircraft and, in particular, to instrument panel systems and methods configured to allow existing aircraft to be retrofit with new or modern avionics systems.

BACKGROUND

Well-maintained small private aircraft may be in service indefinitely, and many small private aircraft currently in service have been in service since 1960's or earlier.

The present invention is of particular significance when applied to certain models of Cessna aircraft manufactured from approximately 1962 to approximately 1974, and that application of the present invention will be described herein in detail (hereinafter "legacy aircraft"). The principles of the present invention may, however, be applied to other aircraft, and the present invention may have applicability to aircraft other than the legacy aircraft depicted and described herein.

Avionics systems have advanced significantly in the last 25 years, and many legacy aircraft were originally manufactured without the advanced avionics systems currently available or even knowledge of the form factor of such advanced avionics systems. Accordingly, the original instrument panel assemblies of existing legacy aircraft cannot easily be modified to accept modern avionics systems without modifications that may adversely affect the structural integrity of the aircraft.

The need thus exists for improved systems and methods for retrofitting existing legacy aircraft with adversely affecting the structural integrity of the aircraft.

SUMMARY

The present invention may be embodied as a replacement instrument panel assembly for an aircraft having an airframe and an upper skin. The replacement instrument panel assembly comprises a support system, a base panel assembly, a secondary panel assembly, and a skin extension assembly. The support system adapted to be secured to the airframe. The base panel assembly is supported by the support system and comprises a base panel member defining at least one main base panel opening. The secondary panel assembly comprises at least one secondary panel member and at least one secondary panel screw. Each secondary panel member defines at least one secondary panel opening and is secured to the base panel by the at least one secondary panel screw. The skin extension assembly comprises a skin extension member supported by the support system and adapted to be secured to a portion of the upper skin.

The present invention may also be embodied as a method of installing a replacement instrument panel assembly in an aircraft having an airframe and an upper skin, the method comprising the following steps. At least a portion of the upper skin is removed to obtain a remaining portion of the upper skin. A support system is secured to the airframe. A base panel assembly comprising a base panel member defining at least one main base panel opening is provided. The base panel assembly is supported from the support system in a desired position relative to the airframe. At least one secondary panel assembly comprising at least one secondary panel member and at least one secondary panel screw is provided. Each secondary panel member defines at least one secondary panel opening. The at least one secondary panel member is secured to the base panel using the at least one secondary panel screw. A skin extension member is provided. At least a portion of the skin extension member is supported from the support system. At least a portion of the skin extension member is secured to the remaining portion of the upper skin.

The present invention may also be embodied as a replacement instrument panel assembly for an aircraft having an airframe and an upper skin, the replacement instrument panel assembly comprising a support system, a base panel assembly, a secondary panel assembly, and a skin extension assembly. The support system is adapted to be secured to the airframe and comprises a perimeter support assembly, an inner support assembly, a yoke support adapter assembly, and a plurality of support system rivets. The base panel assembly supported by the support system and comprises a base panel member defining at least one main base panel opening. The secondary panel assembly comprises at least one secondary panel member and at least one secondary panel screw. Each secondary panel member defines at least one secondary panel opening and is secured to the base panel by the at least one secondary panel screw. The skin extension assembly comprises a skin extension member supported by the support system and adapted to be secured to a portion of the upper skin by at least one skin extension rivet.

BRIEF DESCRIPTION OF THE DRAWINGS

FIG. 12 is a front elevation view depicting a second example set of secondary panel assemblies that may be combined with the first example base panel member to form a second example replacement panel assembly of the present invention;

FIG. 13 is a front elevation view depicting the combination of the second example set of secondary panel assemblies and the first example base panel member to form the second example replacement panel assembly;

DETAILED DESCRIPTION

Figure 1:
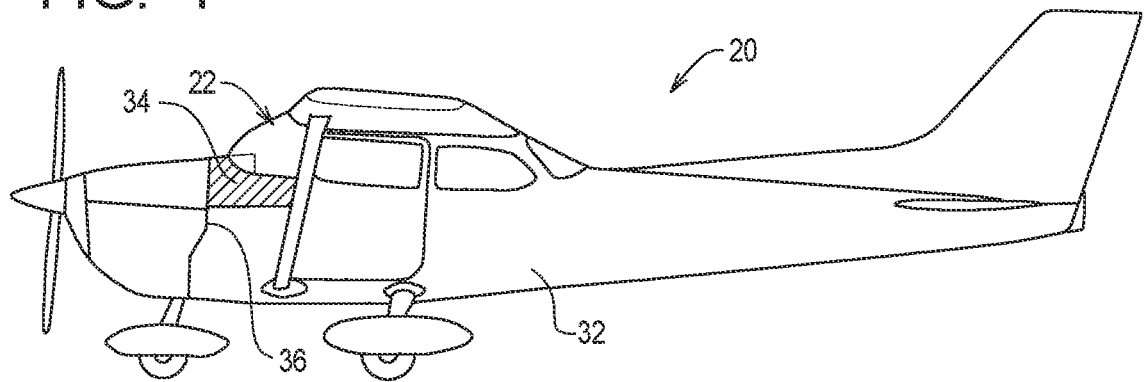
FIG. 1 is a side elevation view of a legacy aircraft of the type that may be retrofit with a replacement instrument panel system of the present invention.

Referring initially to FIG. 1 of the drawing, depicted at 20 therein is an example aircraft in connection with which the present invention may be used. The example aircraft 20 is or may be conventional and will be described herein only to that extent helpful to a complete understanding of the present invention.

Figure 2:
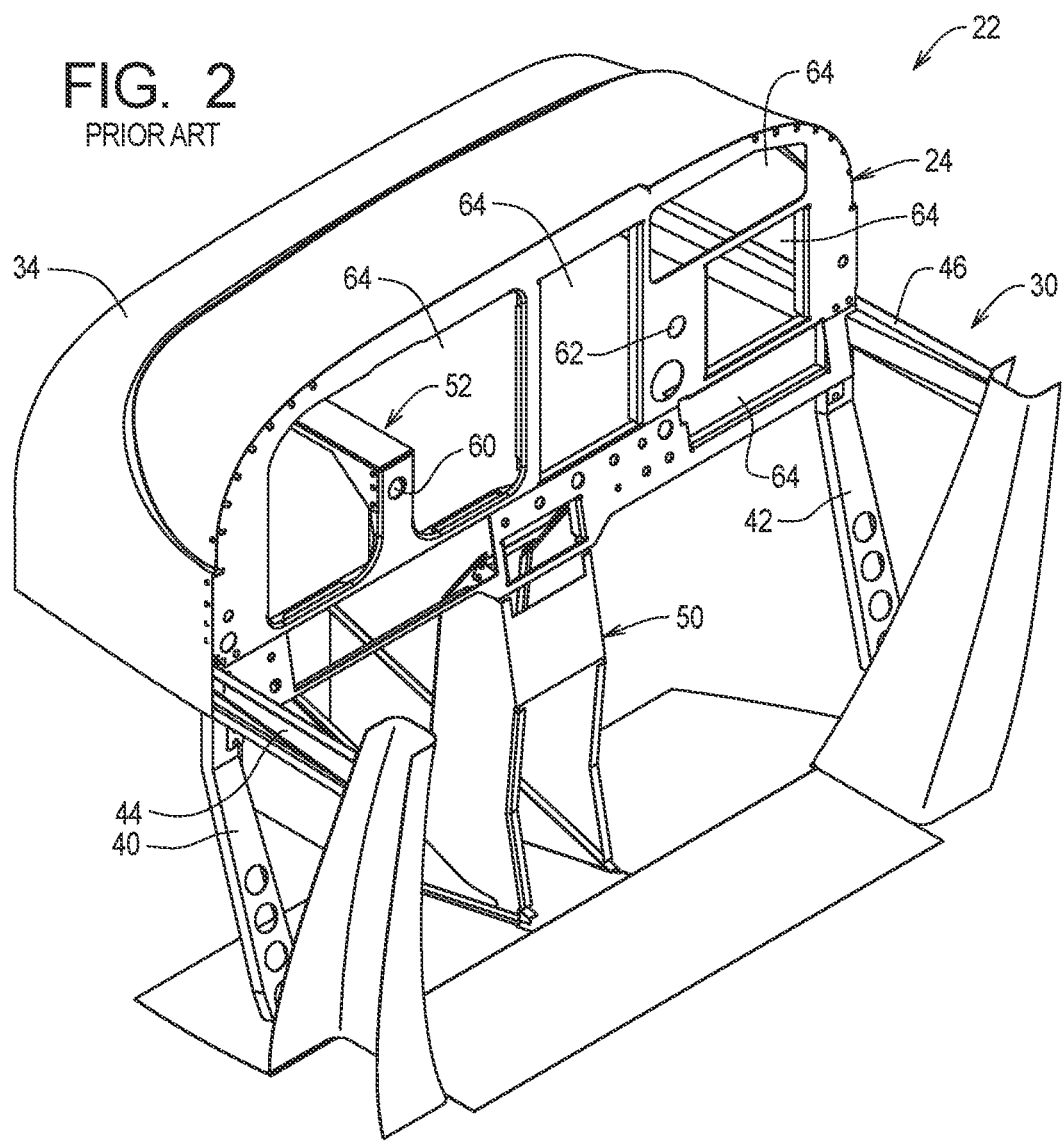
FIG. 2 is a perspective view depicting a cockpit of a legacy aircraft and an original instrument panel assembly supported within that cockpit.
Figure 3:
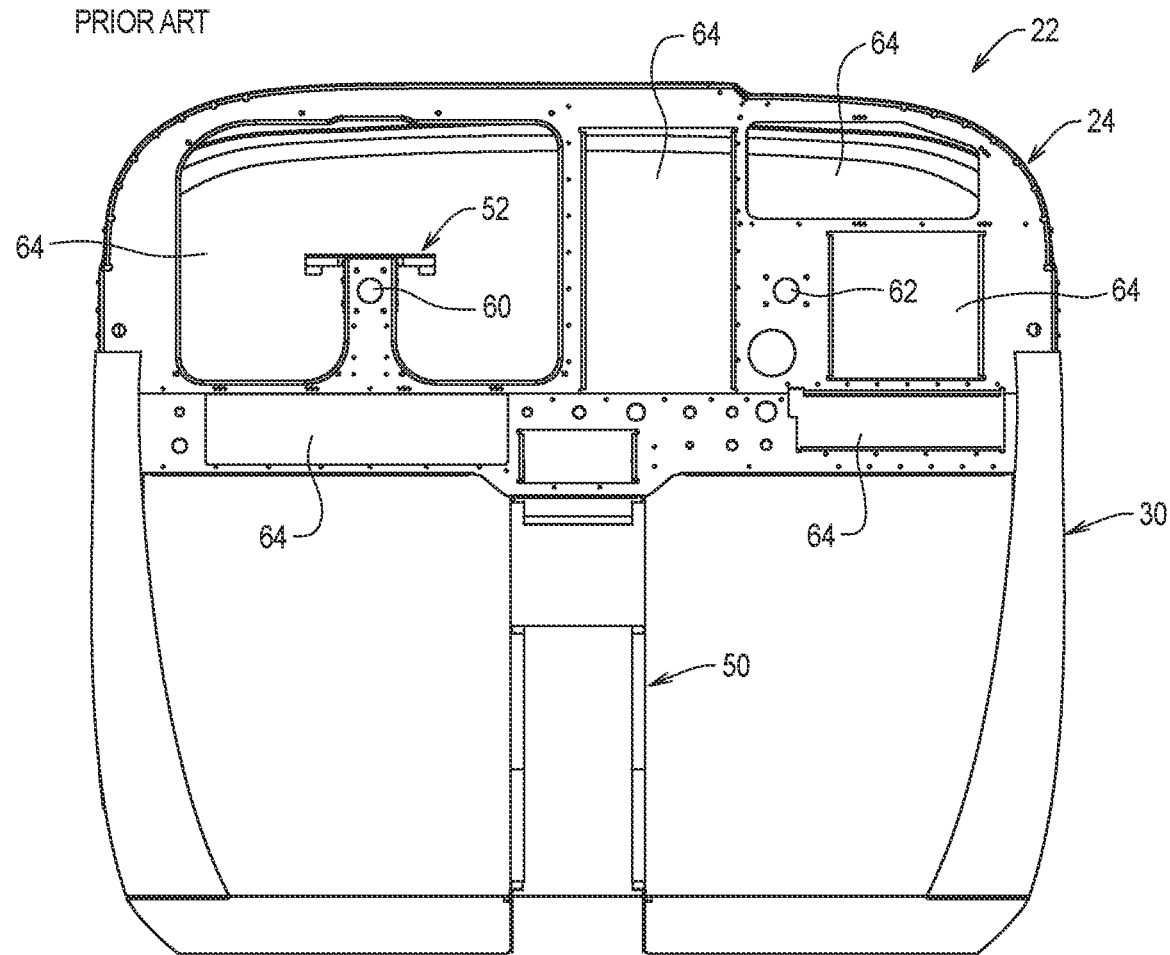
FIG. 3 is a front elevation view depicting the original instrument panel supported within the cockpit of a legacy aircraft.

FIG. 1 illustrates that the example aircraft 20 defines a cockpit area 22, and FIGS. 2 and 3 illustrate an example original instrument panel assembly 24 supported within that cockpit area 22. FIGS. 2 and 3 further illustrates a portion of an example airframe assembly 30 of the example aircraft 20. The example airframe assembly 30 supports an outer skin 32, and a cross-hatched area of FIG. 1 illustrates an upper skin portion 34 of the outer skin 32. The upper skin portion 34 extends from a firewall 36 to the cockpit area 22.

FIGS. 2 and 3 illustrate that the example airframe assembly 30 comprises first, second, third, and fourth airframe portions 40, 42, 44, and 46 and that the airframe assembly 30 further supports a center console support assembly 50 and a yoke support assembly 52. FIGS. 2 and 3 further illustrate that the example original instrument panel 24 defines a first yoke opening 60, a second yoke opening 62, and one or more instrument openings 64.

The location and structure of the example airframe assembly 30, center console support assembly 50, and yoke assembly 52 are not substantially changed or modified by the systems and methods of the present invention. Further, the locations of the first and second yoke openings 60 and 62 and the instrument opening(s) 64 are not affected or changed the systems and methods of the present invention.

Turning now to FIGS. 3-11 of the drawing, depicted therein is a first example replacement instrument panel system 120 comprising a first example replacement panel assembly 122. The first example replacement panel assembly 122 comprises a base panel assembly 130, a first example secondary panel assembly 132, a skin extension assembly 134, and a support system 136.

Figure 4:
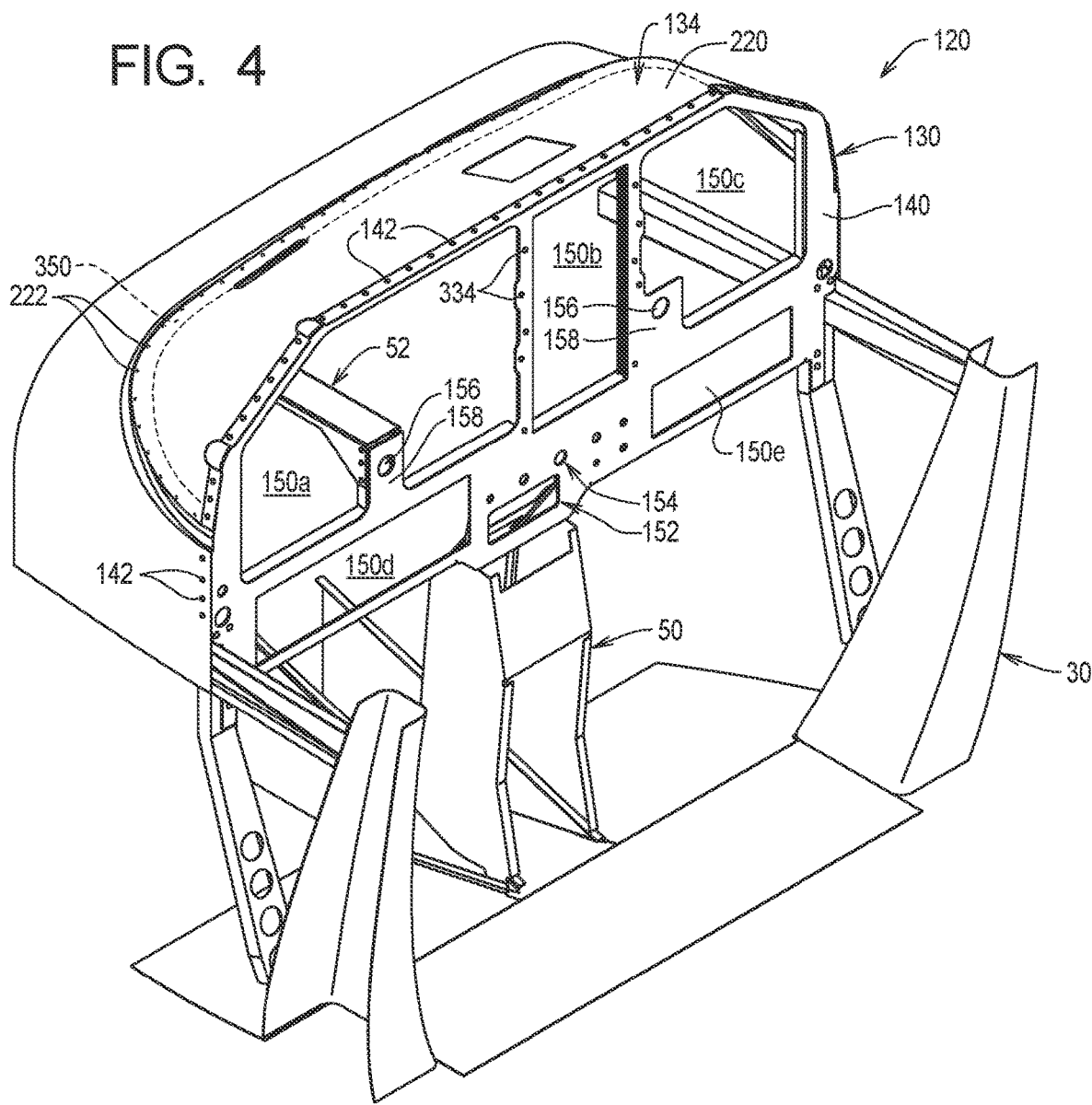
FIG. 4 is a perspective view depicting the cockpit of a legacy aircraft and a portion of a first example replacement instrument panel assembly of the present invention supported within that cockpit.
Figure 5:
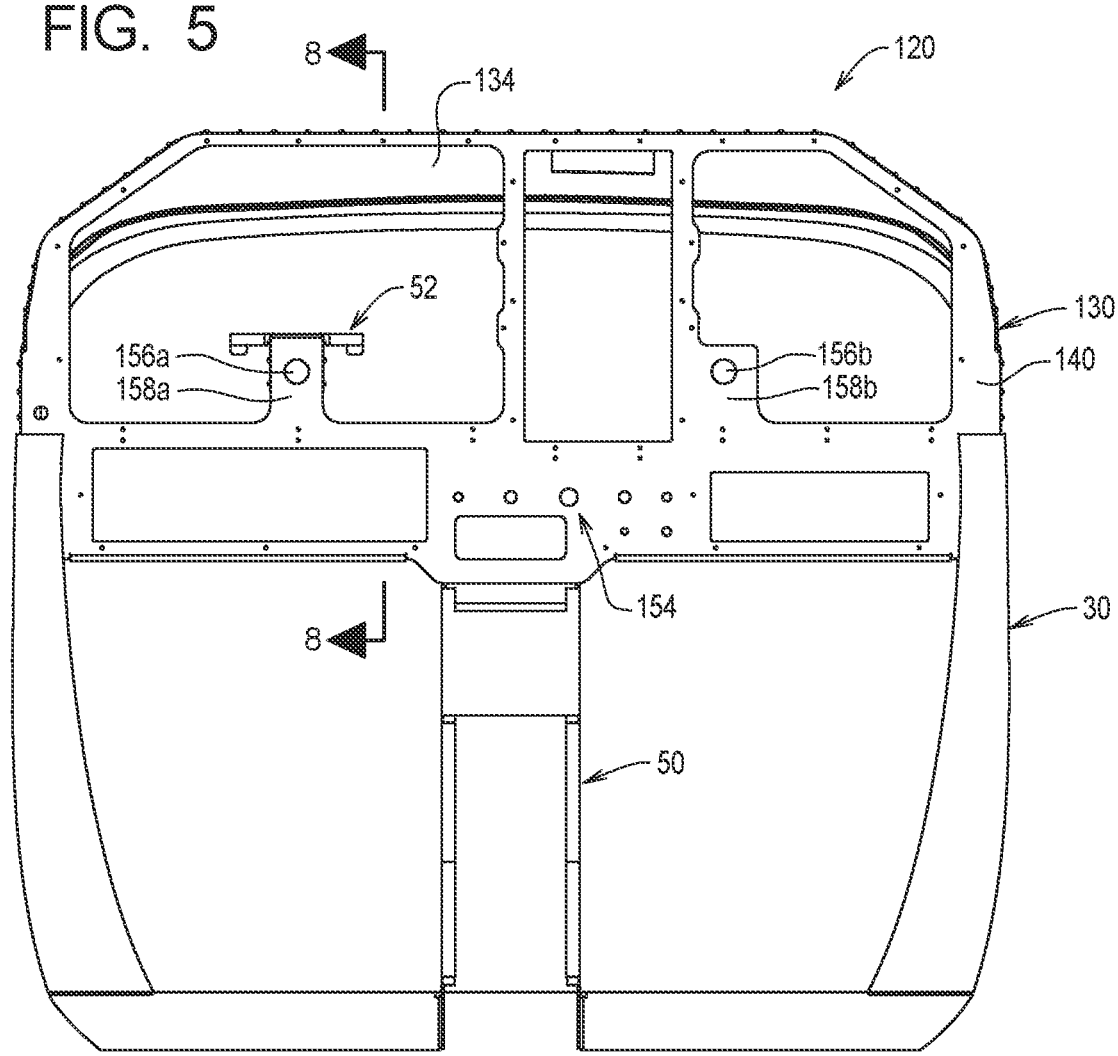
FIG. 5 is a front elevation view depicting the first example replacement instrument panel system supported within the cockpit area of a legacy aircraft.
Figure 9:
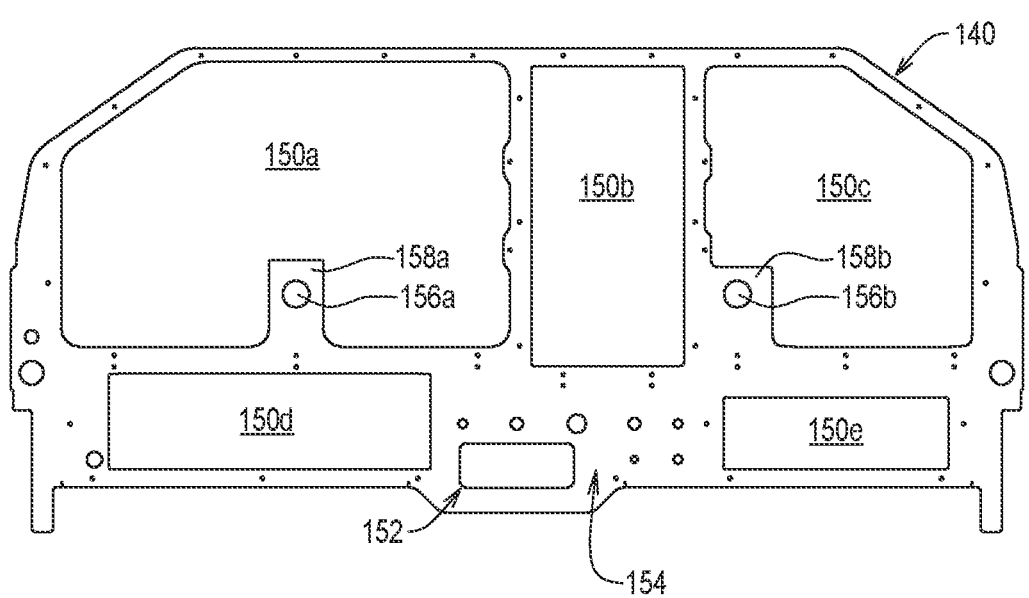
FIG. 9 is a front elevation view of an example base panel member of the first example replacement panel assembly.

FIGS. 4 and 9 illustrate that the example base panel assembly 130 comprises a first example base panel member 140 and a plurality of base panel rivets 142. FIGS. 4 and 9 further illustrate that the first example base panel member 140 defines one or more main base panel openings 150, one or more ancillary base opening(s) 152, a plurality of control openings 154, and one or more yoke openings 156. Other openings are typically formed in the first example base panel member 140 to facilitate assembly of the first example replacement panel assembly 122 as will be described in further detail below. The first example base panel member 140 defines first, second, third, fourth, fifth, and sixth primary base openings 150a, 150b, 150c, 150d, and 150e.

FIG. 9 further illustrates that first example panel member 140 further defines one or more yoke portions 158. In the first example base panel member 140, a first yoke opening 156a is formed in a first yoke portion 158b, and a second yoke opening 156b is formed in a second yoke portion 158b.

Figure 10:
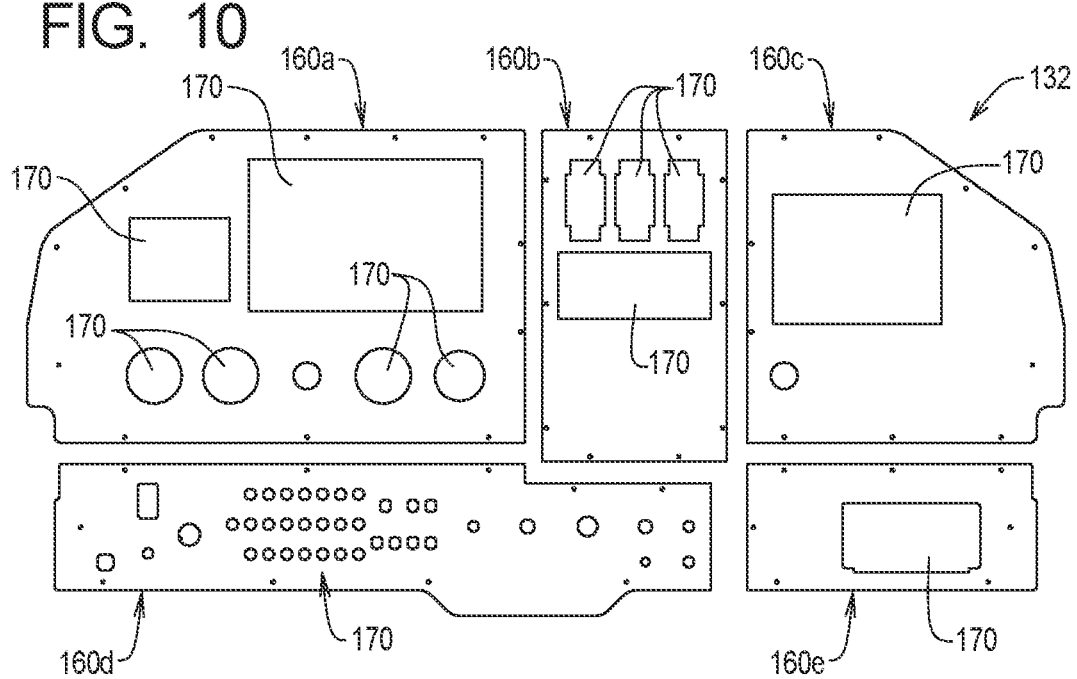
FIG. 10 is a front elevation view depicting a first example set of secondary panel assemblies that may be combined with the first example base panel member to form a first example replacement panel assembly of the present invention.
Figure 11:
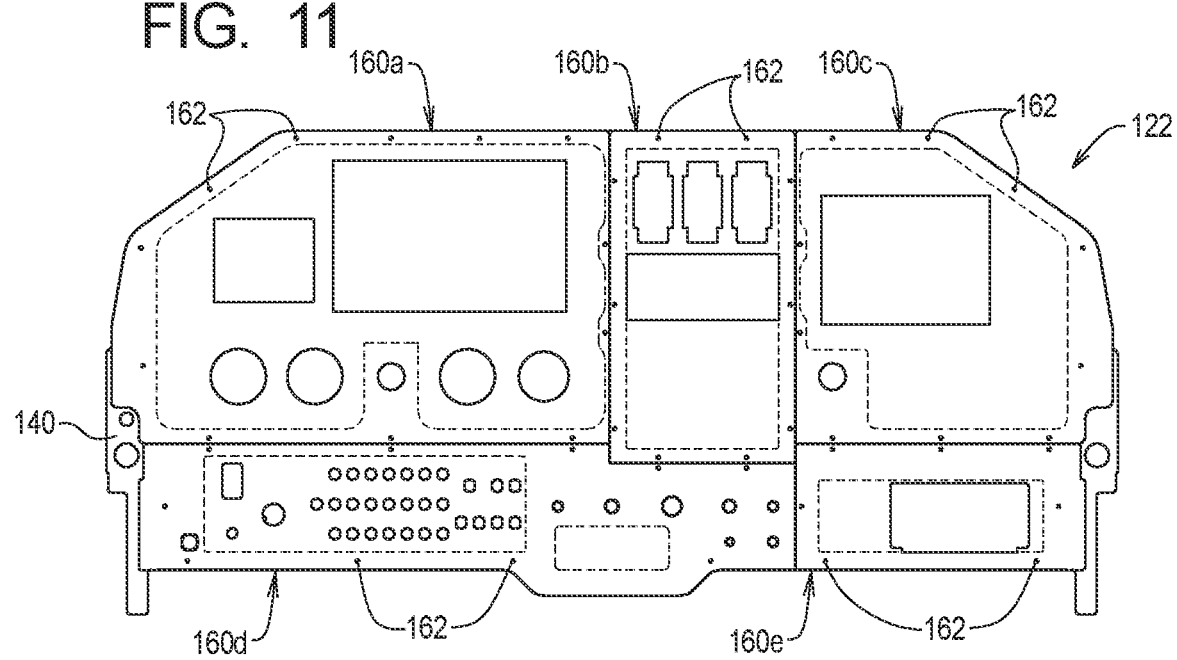
FIG. 11 is a front elevation view depicting the combination of the first example set of secondary panel assemblies and the first example base panel member to form the first example replacement panel assembly.

FIGS. 10 and 11 illustrate that first example secondary panel assembly 132 comprises at least one, and typically a plurality of, secondary panel member(s) 160 and a plurality of secondary panel assembly screws 162. Each of the secondary panel member(s) 160 defines at least one, and typically a plurality of, secondary panel opening(s) 170. As perhaps best shown in FIGS. 10 and 11, the first example secondary panel assembly 132 comprises first, second, third, fourth, and fifth example secondary panel members 160a, 160b, 160c, 160d, and 160e. Each of the example secondary panel members 160a, 160b, 160c, 160d, and 160e in turn defines a plurality of the secondary panel openings 170.

Figure 6:
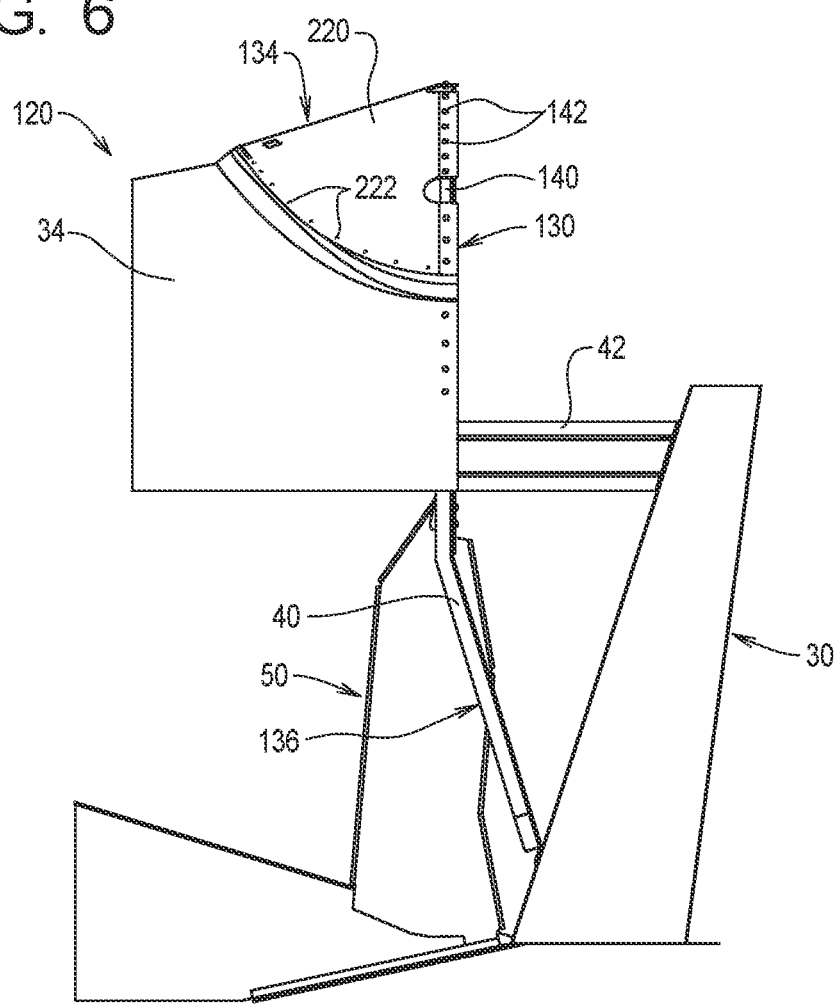
FIG. 6 is a side elevation view depicting the first example replacement instrument panel system supported within the cockpit area of a legacy aircraft.
Figure 7:
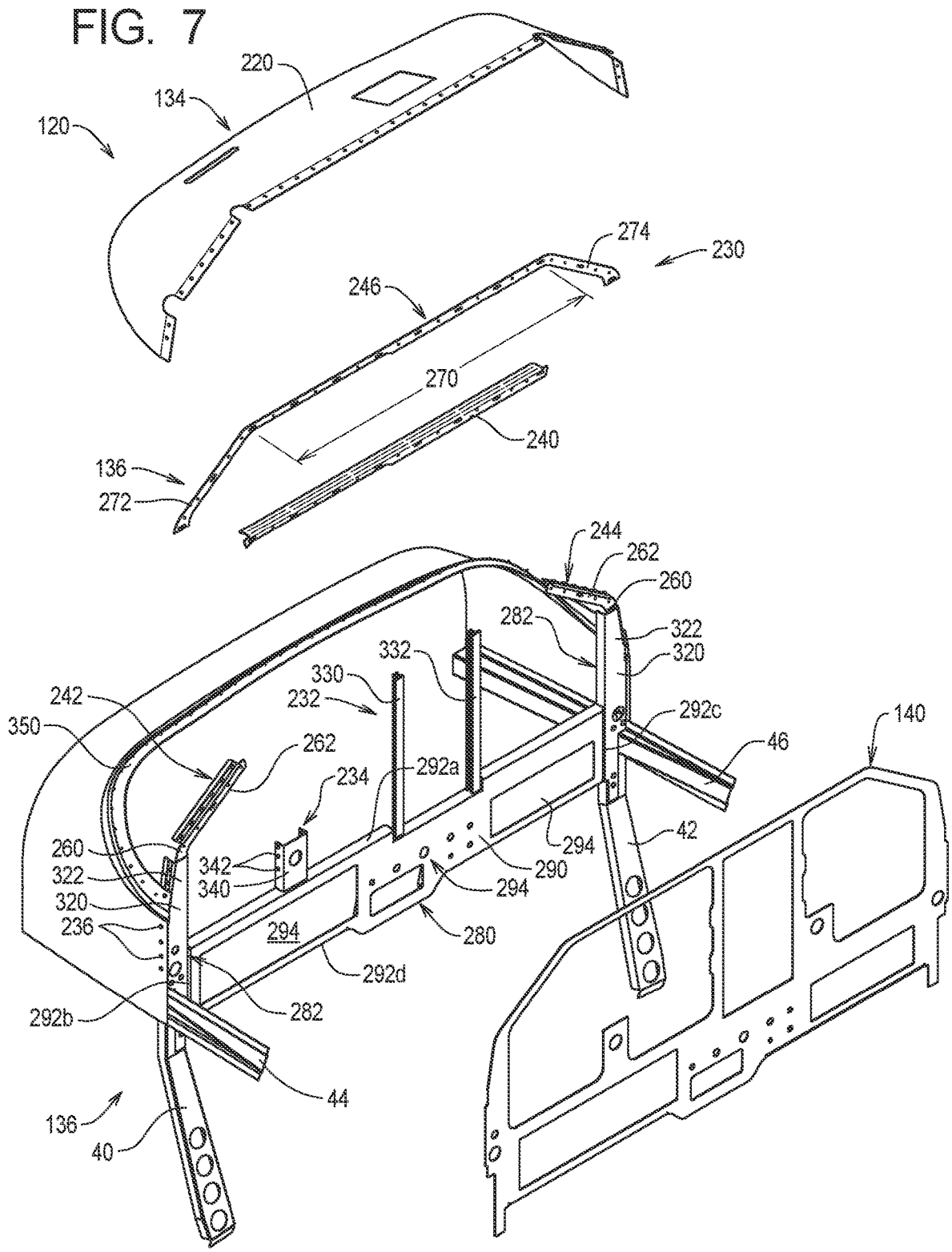
FIG. 7 is a partially exploded perspective view depicting the first example replacement instrument panel system and relevant structure of the airframe of a legacy aircraft.

FIGS. 4, 6, and 7 illustrate that the example skin extension assembly 134 comprises a skin extension member 220 and a plurality of skin extension rivets 222.

FIG. 7 perhaps best illustrates that the example support system 136 comprises a perimeter support assembly 230, an inner support assembly 232, a yoke support assembly 324, and a plurality of support system rivets 236. The example perimeter support assembly 230 comprises a center upper support member 240, a first side upper support member 242, a second side upper support member 244, a reinforcing member 246, a lower support member 280, a first side lower support member 282, and a second side lower support member 284.

Figure 8:
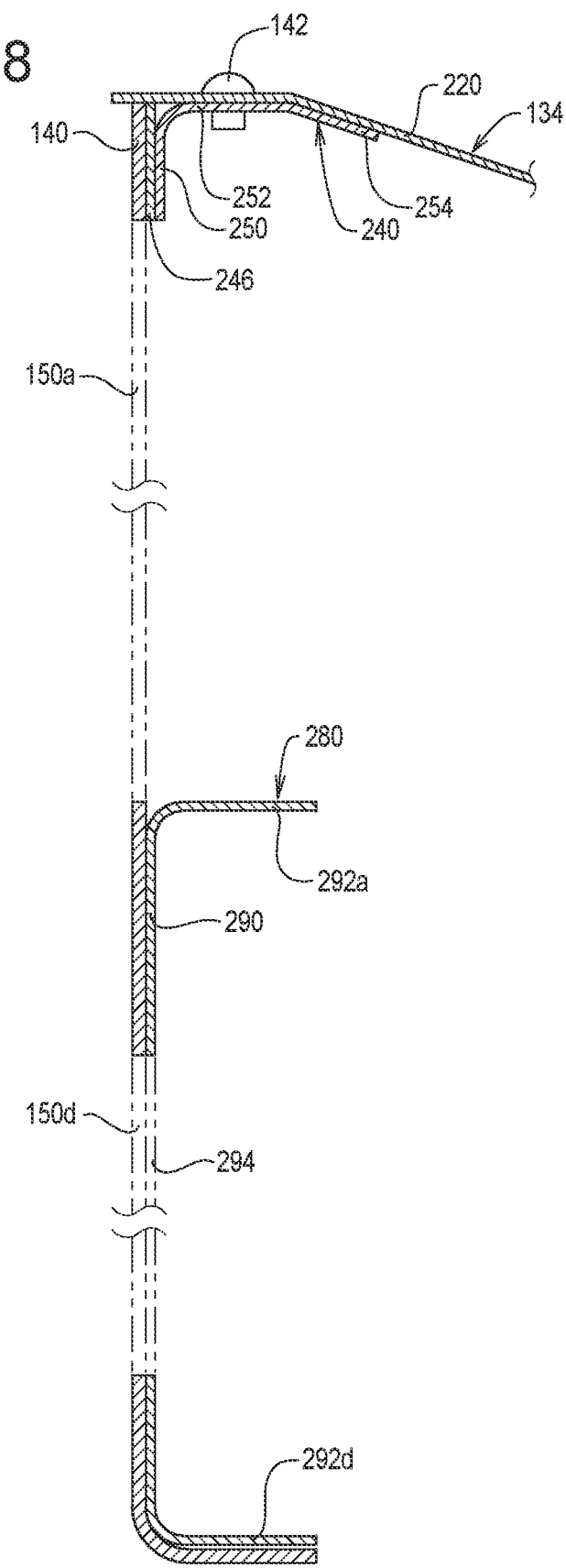
FIG. 8 is a section view taken along lines 8-8 in FIG. 5.

FIG. 8 illustrates that the example center upper support member 240 defines a profile having a first center upper support member portion 250, a second center upper support member portion 252, and a third center support member portion 254.

Each of the first and second side upper support members 242 and 244 comprises a transition portion 260 and a connecting portion 262. The transition portions 260 are adapted to be connected to the first center upper support member 240, and the connecting portions 262 are adapted to be secured to the first and second airframe portions 40 and 42.

The example reinforcing member 246 defines a lateral portion 270 and first and second angled portions 272 and 274. When assembled, the example lateral portion 270 is aligned with and reinforces the first center upper support member 240, while the first and second angled portions 272 and 274 align with and reinforce the transition portions 260 of the first and second upper support members 242 and 244, respectively. The example reinforcing member 246 thus reinforces the connections between the center upper support member 240 and the first and second side upper support members 242 and 244 when assembled.

The example lower support member 280 defines a lower support member main portion 290 and one or more lower support member edge portions 292. The example lower support member 280 defines first, second, third, and fourth lower support member edge portions 292a, 292b, 292c, and 292d that extend at approximately a right angle from the lower support member main portion 290. The example lower support member 280 is generally in the shape of a five sided rectangular box and is adapted to engage first and second lower support members 282 and 284 and to engage and reinforce the base panel member 140. At least one lower support member control opening 294 is formed in the lower support member main portion 290.

Each of the first and second side lower support members 282 and 284 defines a lower portion 320 and an upper portion 322. The lower portion 320 is sized and dimensioned to engage the third and fourth airframe portions 44 and 46, and the upper portions 322 are adapted to engage the first and second side upper support members 242 and 244, respectively.

The example inner support assembly 232 comprises a first side mounting member 330, a second side mounting member 332, and a plurality of mounting member rivets 334. The inner support assembly 232 is or may be conventional and is designed to support a radio unit (not shown).

The example yoke support adapter assembly 234 comprises a yoke support member 340 and a plurality of yoke support rivets 342. The example yoke support member 340 is generally in the shape of a five sided rectangular box and is adapted to engage the example yoke support assembly 52.

To assemble the first example replacement instrument panel assembly 122, the original instrument panel assembly 24 is removed from the aircraft 20, leaving the first, second, third, and fourth airframe portions 40, 42, 44, and 46, the center console support assembly 50, and the yoke support assembly 52. The upper skin portion 34 is modified by cutting back the skin portion along a line adjacent to the firewall 36, leaving a skin portion attachment portion 350.

The first example replacement panel assembly 122 is next formed by using the support system rivets 236. In particular, the center upper support member 240, the first and second side upper support members 242 and 244, the reinforcing member 246, the lower support member 280, and first and second side lower support members 282 and 284 are riveted to the base panel member 140.

The perimeter support assembly 230 is secured to the airframe assembly 30 using the support system rivets 236. In particular, the connecting portions 262 of the first and second side support members s 242 and 244 and the first and second lower support members 282 and 284 are secured by the support system rivets 236 to the airframe assembly 30 and, in particular, to the first, second, third, and/or fourth airframe portions 40, 42, 44, and 46.

With the perimeter support assembly 230 secured to the airframe assembly 30, the base panel assembly 130 is supported relative to the airframe assembly 30. In addition, the base panel assembly 130 may further be riveted to the center console assembly 50 and to the yoke support assembly 52 through the yoke support adapter assembly 234. Further, the skin extension member 220 is secured to the perimeter support assembly 230 by the support system rivets 236 and to the skin portion attachment portion 350 by skin extension rivets 222 as perhaps shown in FIGS. 4 and 6. With the base panel assembly 130 supported by the airframe assembly 30, the base panel 130 is in a desired spatial position and orientation within the cockpit area 22.

At this point, the secondary panel member(s) 160 are secured to the base panel assembly 130 to form the replacement instrument panel assembly 122 such that at least one of the secondary panel members 160 is secured to the base panel member 140 by the secondary panel screws 162 such that desired secondary panel openings 170 are arranged within at least one of the primary base openings 150. In the example depicted in FIGS. 9-11, the first, second, third, fourth, and fifth example secondary panel members 160a, 160b, 160c, 160d, and 160e are secured to the base panel member 140 by the secondary panel screws 162 such that desired secondary panel openings 170 are arranged within at least one of the first, second, third, fourth, and fifth primary base openings 150a, 150b, 150c, 150d, and 150e defined by the base panel member 140. The example secondary panel openings 170 are associated with a typical Dynon Electronic Flight Display (EFD) System configuration. Instruments such as display panels, gauges, switches, and the like (not shown) of a Dynon EFD System may thus be supported by the first example replacement panel assembly 122.

Turning now to FIGS. 12 and 13 of the drawing, depicted therein is a second example panel replacement assembly 420 comprising a second example secondary panel assembly 422 that may be connected to the first example base panel member 140 as part of the first example replacement panel system 120. FIGS. 12 and 13 illustrate that second example secondary panel assembly 422 comprises at least one, and typically a plurality of, secondary panel member(s) 430 and a plurality of secondary panel assembly screws 432. Each of the secondary panel member(s) 430 defines at least one, and typically a plurality of, secondary panel opening(s) 440. FIGS. 12 and 13 further illustrate that the second example secondary panel assembly 422 comprises first, second, third, fourth, and fifth example secondary panel members 430a, 430b, 430c, 430d, and 430e. Each of the example secondary panel members 430a, 430b, 430c, 430d, and 430e in turn defines a plurality of the secondary panel openings 440. The example secondary panel openings 440 are associated with a typical Garmin EFD System configuration. Instruments such as display panels, gauges, switches, and the like (not shown) of a Garmin EFD System may thus be supported by the second example replacement panel assembly 420.

Figure 14:
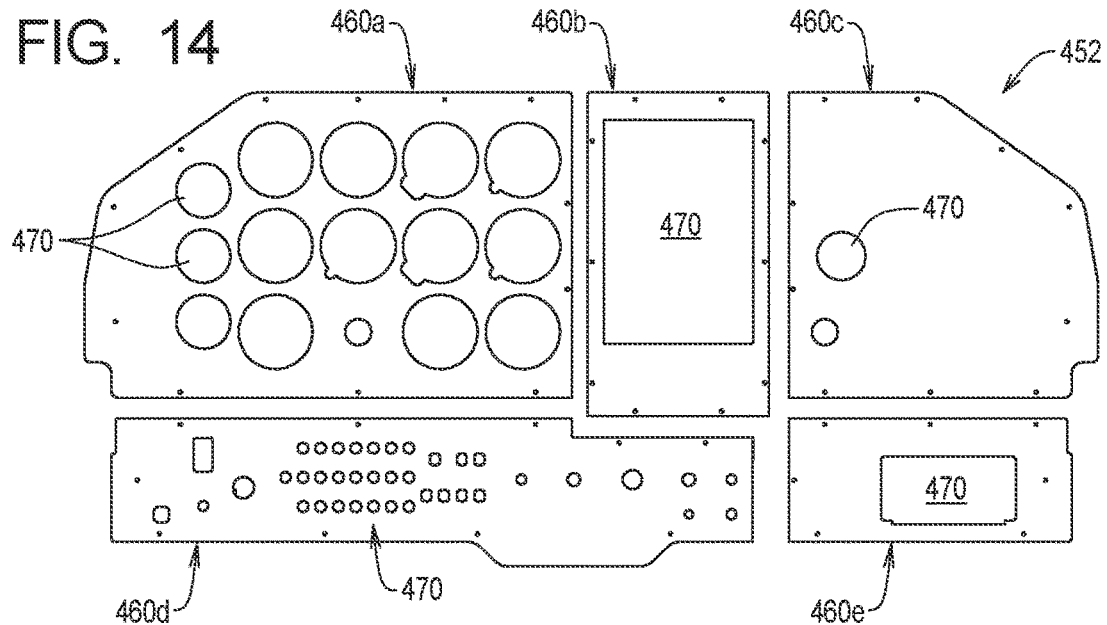
FIG. 14 is a front elevation view depicting a third example set of secondary panel assemblies that may be combined with the first example base panel member to form a third example replacement panel assembly of the present invention.
Figure 15:
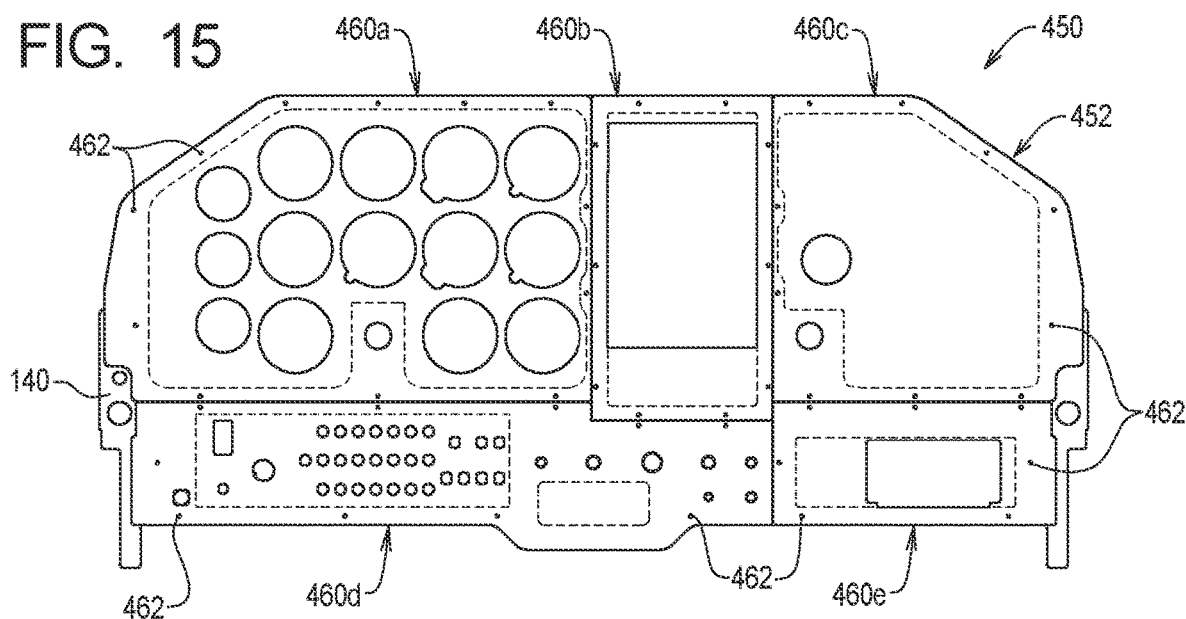
FIG. 15 is a front elevation view depicting the combination of the third example set of secondary panel assemblies and the first example base panel member to form the third example replacement panel assembly.

FIGS. 14 and 15 of the drawing illustrate a third example panel replacement assembly 450 comprising a third example secondary panel assembly 452 that may be connected to the first example base panel member 140 as part of the first example replacement panel system 120. FIGS. 14 and 15 illustrate that third example secondary panel assembly 452 comprises at least one, and typically a plurality of, secondary panel member(s) 460 and a plurality of secondary panel assembly screws 462. Each of the secondary panel member(s) 460 defines at least one, and typically a plurality of, secondary panel opening(s) 470. FIGS. 14 and 15 further illustrate that the third example secondary panel assembly 452 comprises first, second, third, fourth, and fifth example secondary panel members 460a, 460b, 460c, 460d, and 460e. Each of the example secondary panel members 460a, 460b, 460c, 460d, and 460e in turn defines a plurality of the secondary panel openings 470. The example secondary panel openings 470 are associated with a typical Traditional "T" (Pilot's Six Pack) configuration with standard 3⅛ and 2¼ analog gauges. Instruments such as display panels, gauges, switches, and the like (not shown) of a Pilot's Six Pack System may thus be supported by the third example replacement panel assembly 450.

The first example replacement instrument panel system 120 may thus include the base panel assembly 130 in combination with one of the first example secondary panel assembly 132, the second example secondary panel assembly 422, or the third example secondary panel assembly 452 depending on the configuration of the EFD System desired by the owner or operator of the aircraft 20.

Figure 16:
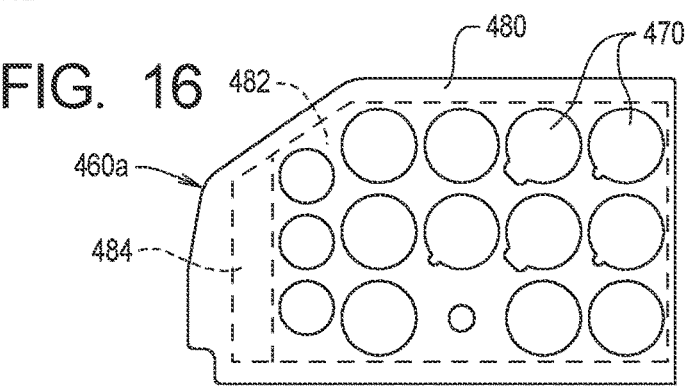
FIG. 16 is a front elevation of a portion of one of the example secondary panels of the third example set of secondary panels illustrating first, second, and third areas of that example secondary panel.

Turning now to FIG. 16 of the drawing, depicted therein is a representation of the first example secondary panel member 460*a* of the third example secondary panel assembly 452. Broken lines in FIG. 16 illustrate that the first example secondary panel member 460*a* may be divided into first, second, and third regions 480, 482, and 484. The example first region 480 extends around a perimeter of the first example secondary panel member 460*a*. The example second and third regions 482 and 484 lie within the boundaries of the first region 480. The example first region 480 generally overlaps the surface area of the first example base panel member 140, while the example second and third regions lie within the first primary base opening 150*a* defined by the example panel member 140. The secondary panel screws 162 extend through the first example secondary panel member 460*a* and into the first example base panel member 140 within the first region 480.

The example secondary panel opening(s) 470 defined by the first example secondary panel member 460*a* are all arranged within the second region 482 so that instruments mounted within these secondary panel openings 470 are not obstructed by the first example base panel member 140.

One or more additional secondary panel openings 470 may be formed within the third region 484, but these additional secondary panel openings 470 are limited in size and number to maintain the structural integrity supplied by the first example secondary panel member 460*a* to the third example replacement panel assembly 450. Accordingly, a limited number of control elements, such as headphone jacks, toggle switches, and/or indicator lights, that require small openings for mounting may be arranged in the third region 484.

The secondary panel members 160 and 430 may similarly define first, second, and third regions like the first, second, and third regions 480, 482, and 484 defined by the secondary panel member 460*a* as described above.

What is claimed is:

1. A replacement instrument panel assembly for an aircraft having an airframe and an upper skin, the replacement instrument panel assembly comprising:
    a support system adapted to be secured to the airframe;
    a base panel assembly supported by the support system, the base panel assembly comprising a base panel member defining at least one main base panel opening;
    a secondary panel assembly comprising at least one secondary panel member and at least one secondary panel screw, where
        each secondary panel member defines at least one secondary panel opening, and
        is secured to the base panel by the at least one secondary panel screw; and
    a skin extension assembly comprising a skin extension member supported by the support system and adapted to be secured to a portion of the upper skin.

2. A replacement instrument panel assembly as recited in claim 1, in which the support system comprises a perimeter support assembly, an inner support assembly, a yoke support adapter assembly, and a plurality of support system rivets.

3. A replacement instrument panel assembly as recited in claim 2, in which the perimeter support assembly comprises a center upper support member, a first side upper support member, a second side upper support member, a reinforcing member, a lower support member, a first side lower support member, and a second side lower support member.

4. A replacement instrument panel assembly as recited in claim 2, in which the inner support assembly comprises a first side mounting member, a second side mounting member, and a plurality of mounting member rivets.

5. A replacement instrument panel assembly as recited in claim 2, in which the yoke support adapter assembly comprises a yoke support member and a plurality of yoke support rivets.

6. A replacement instrument panel assembly as recited in claim 1, in which the secondary panel assembly comprises a plurality of secondary panel members.

7. A replacement instrument panel assembly as recited in claim 1, in which the skin extension assembly comprises at least one skin extension rivet.

8. A method of installing a replacement instrument panel assembly in an aircraft having an airframe and an upper skin, the method comprising the steps of:
    removing at least a portion of the upper skin to obtain a remaining portion of the upper skin;
    securing a support system to the airframe;
    providing a base panel assembly comprising a base panel member defining at least one main base panel opening;
    supporting the base panel assembly from the support system in a desired position relative to the airframe;
    providing a secondary panel assembly comprising at least one secondary panel member and at least one secondary panel screw, where each secondary panel member defines at least one secondary panel opening;
    securing the at least one secondary panel member to the base panel using the at least one secondary panel screw; and
    providing a skin extension member;
    supporting at least a portion of the skin extension member from the support system; and
    securing at least a portion of the skin extension member to the remaining portion of the upper skin.

9. A method as recited in claim 8, in which the support system comprises a perimeter support assembly, an inner support assembly, a yoke support adapter assembly, and a plurality of support system rivets.

10. A method as recited in claim 9, in which the perimeter support assembly comprises a center upper support member, a first side upper support member, a second side upper support member, a reinforcing member, a lower support member, a first side lower support member, and a second side lower support member.

11. A method as recited in claim 9, in which the inner support assembly comprises a first side mounting member, a second side mounting member, and a plurality of mounting member rivets.

12. A method as recited in claim 9, in which the yoke support adapter assembly comprises a yoke support member and a plurality of yoke support rivets.

13. A method as recited in claim 8, in which the secondary panel assembly comprises a plurality of secondary panel members.

14. A method as recited in claim 8, in which the skin extension assembly comprises a skin extension member and a plurality of skin extension rivets.

15. A replacement instrument panel assembly for an aircraft having an airframe and an upper skin, the replacement instrument panel assembly comprising:

a support system adapted to be secured to the airframe, the support system comprises a perimeter support assembly, an inner support assembly, a yoke support adapter assembly, and a plurality of support system rivets;

a base panel assembly supported by the support system, the base panel assembly comprising a base panel member defining at least one main base panel opening;

a secondary panel assembly comprising at least one secondary panel member and at least one secondary panel screw, where
  each secondary panel member defines at least one secondary panel opening, and
  is secured to the base panel by the at least one secondary panel screw; and a skin extension assembly comprising a skin extension member supported by the support system and adapted to be secured to a portion of the upper skin by at least one skin extension rivet.

16. A replacement instrument panel assembly as recited in claim 15, in which the perimeter support assembly comprises a center upper support member, a first side upper support member, a second side upper support member, a reinforcing member, a lower support member, a first side lower support member, and a second side lower support member.

17. A replacement instrument panel assembly as recited in claim 15, in which the inner support assembly comprises a first side mounting member, a second side mounting member, and a plurality of mounting member rivets.

18. A replacement instrument panel assembly as recited in claim 15, in which the yoke support adapter assembly comprises a yoke support member and a plurality of yoke support rivets.

19. A replacement instrument panel assembly as recited in claim 15, in which the secondary panel assembly comprises a plurality of secondary panel members.

20. A replacement instrument panel assembly as recited in claim 15, in which the skin extension assembly comprises a plurality of skin extension rivets.

* * * * *